(12) United States Patent
Binet et al.

(10) Patent No.: US 6,861,618 B2
(45) Date of Patent: Mar. 1, 2005

(54) ELECTRIC BABY FOOD WARMER WITH WATER VAPOR AND COVER FOR AN ELECTRIC BABY FOOD WARMER AND METHOD FOR HEATING BABY FOOD

(75) Inventors: Heidi Binet, Landau (DE); Wolfgang Schaffner, Kuhardt (DE); Hans-Gerd Bummer, Kandel (DE); Michael Caspers, Weinheim (DE)

(73) Assignee: David & Baader GmbH (DE)

( * ) Notice: Subject to any disclaimer, the term of this patent is extended or adjusted under 35 U.S.C. 154(b) by 0 days.

(21) Appl. No.: 10/405,108

(22) Filed: Apr. 1, 2003

(65) Prior Publication Data

US 2003/0222075 A1 Dec. 4, 2003

(30) Foreign Application Priority Data

Apr. 4, 2002 (DE) ......................................... 102 14 905

(51) Int. Cl.[7] ................................................ A47J 36/26
(52) U.S. Cl. ........................ 219/433; 219/401; 219/430; 219/432
(58) Field of Search ................................ 219/385, 386, 219/401, 430, 432, 433, 439

(56) References Cited

U.S. PATENT DOCUMENTS

| | | | | |
|---|---|---|---|---|
| 1,977,482 A | * | 10/1934 | Klause ........................ 219/430 |
| 2,505,092 A | * | 4/1950 | Brewer ........................ 219/433 |
| 2,536,596 A | * | 1/1951 | Fisher ........................ 219/436 |
| 3,119,925 A | * | 1/1964 | Shomock .................... 219/401 |
| 3,585,362 A | * | 6/1971 | Hoogesteger et al. ....... 219/437 |
| 3,869,595 A | * | 3/1975 | Collins et al. .............. 219/387 |
| 3,892,945 A | * | 7/1975 | Lerner ........................ 219/432 |
| 4,365,143 A | * | 12/1982 | Kerber, Jr. .................. 219/401 |
| 4,716,278 A | * | 12/1987 | Cappe et al. ................ 219/387 |
| 4,801,782 A | * | 1/1989 | Ineson ........................ 219/438 |
| 5,773,795 A | | 6/1998 | Messmer |
| 6,100,504 A | | 8/2000 | Wagner |
| 6,234,165 B1 | | 5/2001 | Creighton et al. |
| 6,310,329 B1 | * | 10/2001 | Carter ........................ 219/432 |
| 6,437,295 B1 | * | 8/2002 | Hogg et al. ................. 219/432 |

FOREIGN PATENT DOCUMENTS

| | | | |
|---|---|---|---|
| DE | 3440146 C | * | 11/1984 |
| DE | 44 09 123 | | 9/1995 |
| EP | 0 696 429 | | 2/1996 |
| FR | 2753071 A1 | * | 3/1998 |
| GB | 2 217 975 | | 11/1989 |
| GB | 2 236 386 | | 4/1991 |

* cited by examiner

*Primary Examiner*—Joseph Pelham
(74) *Attorney, Agent, or Firm*—Michael Best & Friedrich LLP

(57) ABSTRACT

The present invention relates to an electric baby food warmer for heating baby food held in a container by means of a heat transfer medium. The baby food warmer comprises a bowl where the container can be inserted for heating, and an electric heating for heating the bowl bottom. The invention further relates to a cover for an electric baby food warmer and to a process for heating baby food held in a container. In order to have an electric baby food warmer, a cover for an electric baby food warmer and a process for heating baby food held in a container, which renders the heating of baby food particularly fast, power saving and secure, according to the invention, water vapor is used as a heat transfer medium and the bowl walls together with the container and/or a cover form an essentially sealed chamber for retaining water vapor.

14 Claims, 3 Drawing Sheets

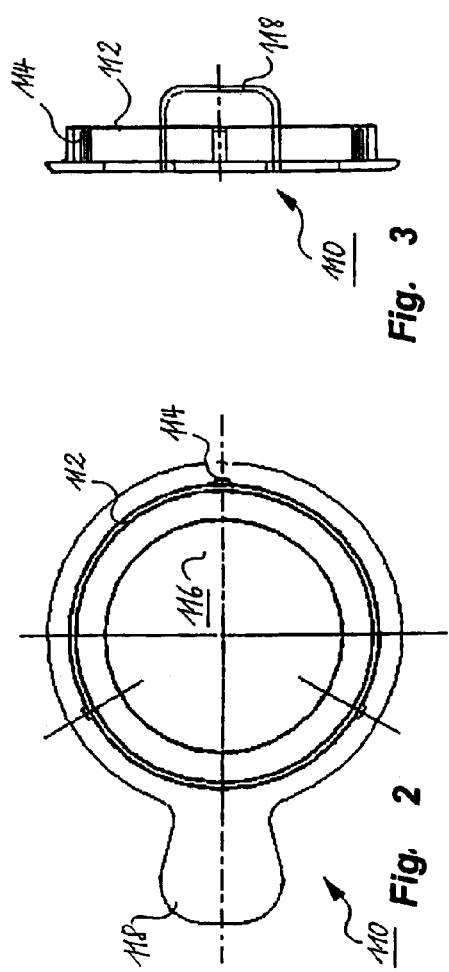
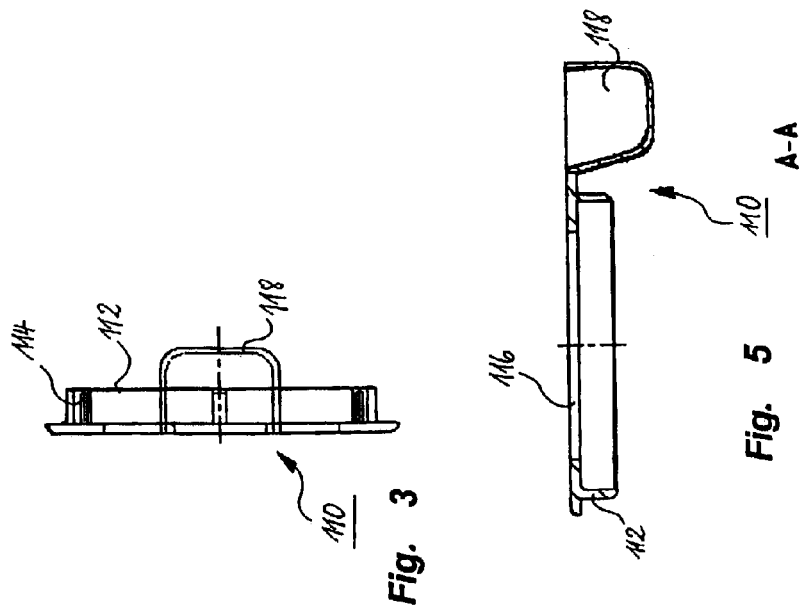
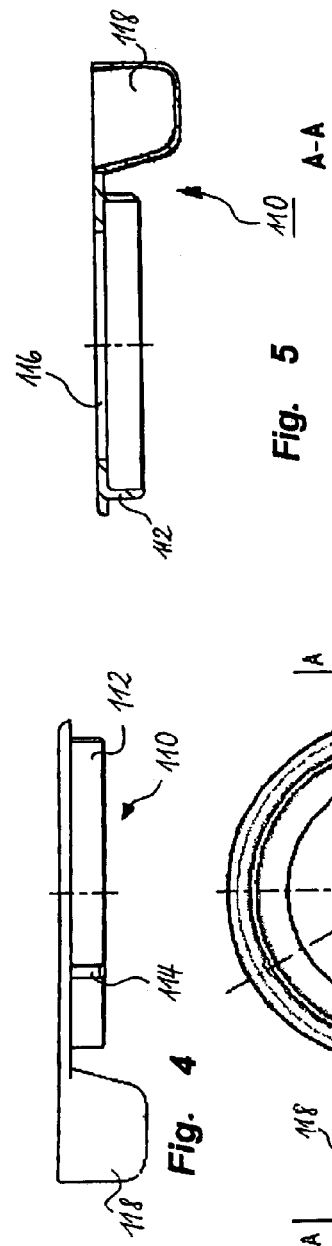
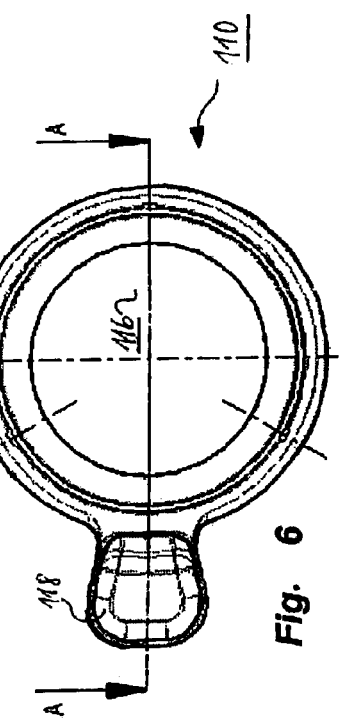

ELECTRIC BABY FOOD WARMER WITH WATER VAPOR AND COVER FOR AN ELECTRIC BABY FOOD WARMER AND METHOD FOR HEATING BABY FOOD

BACKGROUND OF THE INVENTION

1. Field of the Invention

The invention generally relates to electric baby food warmers and methods for heating baby food, and more specifically to an electric baby food warmer for heating baby food held in a container by means of a heat transfer medium. The baby food warmer comprises a bowl where the container can be inserted for heating, and an electric heating for heating the bowl bottom. The invention further relates to a cover for an electric baby food warmer and to a process for heating baby food held in a container.

2. Description of the Related Art

Presently, conventional baby food warmers are filled to the brim with approx. 150 ml of water. Such conventional baby food warmers are known, for example, from EP 0 696 428 B1 or U.S. Pat. No. 5,773,795. In these cases, a baby's feeder with baby food or a glass container with an instant meal is immersed into the water filling the container. The water filling the container is in direct contact with an electrically heated element and serves as heat transfer medium to the bottle and the food contained therein. That is, first, the water filling the container is heated, which in turn heats the container with the baby food. By means of a thermo regulator, the heating element is switched off as soon as the water filling the container has reached a predetermined adjustable temperature.

However, as the temperature of the water filling the container is in general higher than the desired temperature of the baby food if the food is to be heated quickly, even after the heating energy has been switched off, the temperature of the food further increases if the bottle remains in the baby food warmer. Therefore, with such conventional baby food warmers, there is a problem that, if a very fast heating is desired, a very high temperature of the water filling the container has to be adjusted and the heating process has to be interrupted by withdrawing the food container if the temperature of the water bath has reached a predetermined temperature. An all-automatic and fast heating of baby food is difficult with conventional baby food warmers.

From U.S. Pat. No. 6,234,165 B1, a method and a device for a portable baby food warmer independent of an electric energy supply are known, where heat is generated by an exothermic reaction which heats the baby bottle. This portable baby bottle heater which does not work with electric energy, however, has a drawback in that for its operation always chemicals to be especially provided for generating the. exothermic reaction have to be kept ready. Furthermore, the two reaction partners have to be stored separately until the exothermic reaction is to be effected. In U.S. Pat. No. 6,234,165 B1, the exothermic reaction is triggered by releasing an appropriate electrolyte solution, for example a saline solution, into a heating element, for example made of a magnesium-iron alloy or of calcium oxide. The hot gas resulting from this reaction conveys its thermal energy to the baby bottle to be heated as it flows by.

This baby food warmer, however, has several severe drawbacks. On the one hand, the chemicals suited for such an exothermic reaction are for the major part of them problematic as to the safety and in particular in connection with food. This is true for the storage and handling of the starting materials as well as for the later disposal of the end products. Thus, there can be an explosion hazard, for example, when hydrogen gas is formed by the exothermic reaction of a magnesium-iron alloy with an electrolyte solution. Calcium oxide ("unstaked lime"), however, represents a highly caustic compound. On the other hand, most of the resulting gases possess a comparatively low enthalpy of vaporization, so that the heat transfer properties to the bottle can be unsatisfactory.

However, water has an extremely high enthalpy of vaporization, so that the energy conveyed during condensation is very high. These facts are utilized for conventional appliances for sterilizing baby milk bottles according to EP 0 183 956 B1 or U.S. Pat. No. 4,716,278. With these appliances, the baby bottles to be sterilized are in a vapor-filled space hermetically sealed with respect to the surroundings and are heated to nearly 100° C. without any filling with the opening facing downwards. However, these sterilizers are not designed to be used as baby food warmers.

SUMMARY OF THE INVENTION

With respect to the shown drawbacks of the prior art, an improved electric baby food warmer, a cover for an electric baby food warmer and a method for heating baby food held in a container are provided, which render the heating of baby food particularly fast, power saving and secure.

In one embodiment, an electric baby food warmer for heating substances held in a container, preferably baby food, by means of a heat transfer medium, the baby food warmer comprising a bowl, into which the container can be inserted for heating, and an electric heating for heating the bowl bottom is provided, wherein the bowl walls form together with the container and/or a cover an essentially sealed chamber for retaining water vapor.

In another embodiment, a cover for an electric baby food warmer for heating substances held in a container, preferably baby food, by means of a heat transfer medium, the baby food warmer comprising a bowl, into which the container can be inserted for heating, and an electric heating for heating the bowl bottom may be provided, that forms together with the bowl walls and/or the container an essentially sealed chamber for retaining water vapor.

In a further embodiment, a method for heating baby food held in a container by means of an electric heating and a heat transfer medium is provided, wherein the heat transfer medium is water vapor.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein:

FIG. 2 shows a bottom view onto the cover of FIG. 1;

FIG. 3 shows a side view of the cover of FIG. 1;

FIG. 4 shows another side view of the cover of FIG. 1;

FIG. 5 shows a sectional drawing of the cover of FIG. 1 along the section line A—A of FIG. 6;

FIG. 6 shows a top view onto the cover of FIG. 1;

DETAILED DESCRIPTION OF THE INVENTION

The illustrated embodiments of the present invention will be described with reference to the figure drawings wherein like elements and structures are indicated by like reference numbers.

Figure 1:
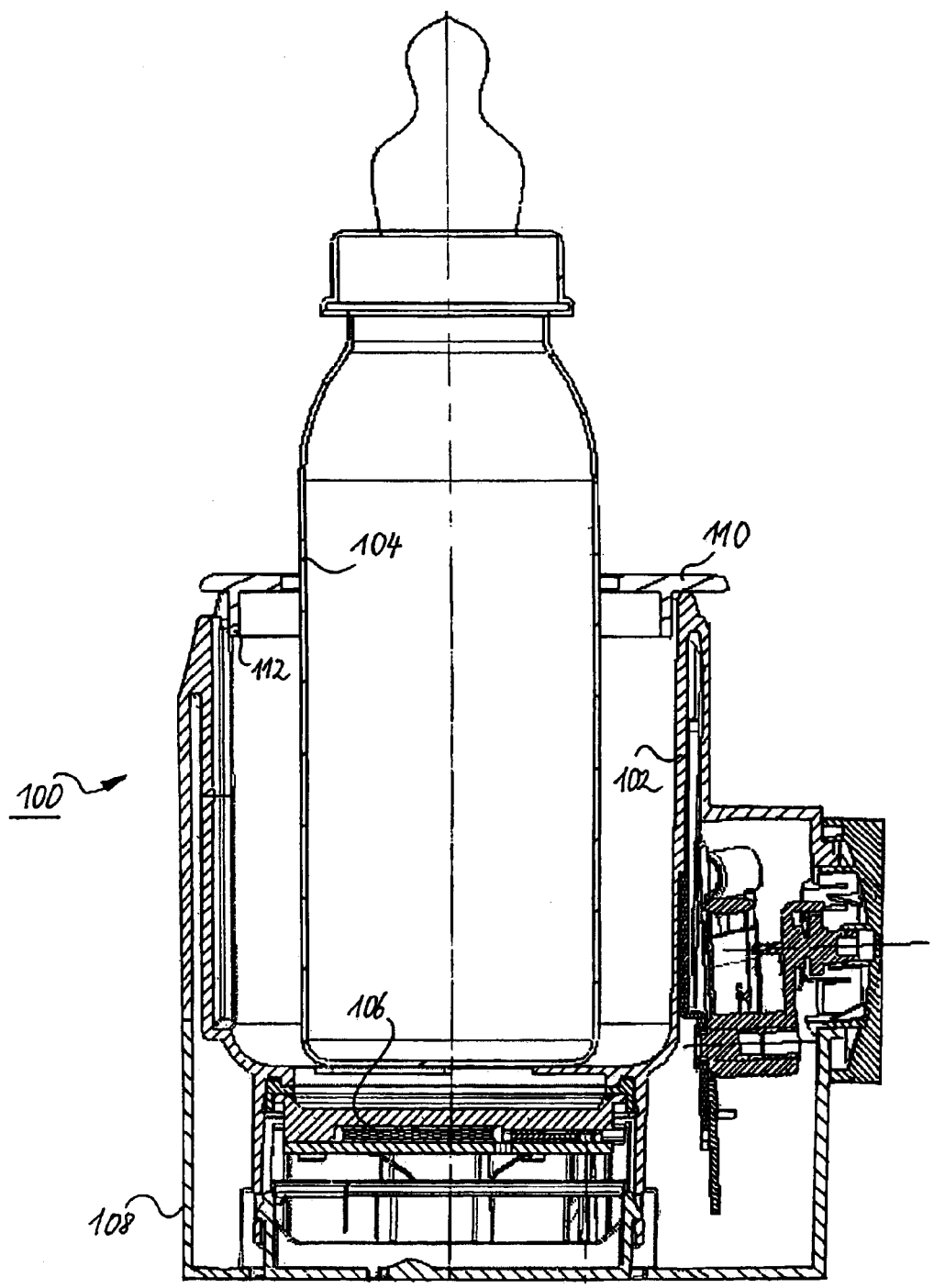
FIG. 1 shows a section through an electric baby food warmer with inserted baby bottle in an operative condition.

Referring now to the drawings and particularly to FIG. 1, the baby food warmer 100 according to the invention comprises a bowl 102 in which a container 104 for heating baby food, in this case a baby's feeder, is inserted. An electric heating 106, for example a PTC-heating element, is attached below the bottom area of the bowl 102, such that the same is heated, when electric power is supplied. The bowl 102, the electric heating 106 as well as further electronic components, such as a power control circuit, are accommodated in a housing 108, preferably made of plastics.

According to the invention, the baby food warmer 100 further comprises a cover 110, which has an annular design in the shown embodiment and covers the space between the bowl 102 and the container 104 from the surroundings, such that an essentially sealed chamber for retaining water vapor is formed. However, the cover 110 does not form a hermetic seal with respect to the surrounding. Via an essentially annular projection 112 integrally formed at the cover, which engages between the bowl's inner wall and the outer wall of the container 104, a positioning of the cover and, via the annular opening in the cover, also of the container 104 can be ensured.

In order to heat the contents of the baby bottle 104, a low amount of water, for example 10 to 20 ml with the capacity of the bowl 102 being approx. 150 ml as shown here, is filled in before the cover 110 is attached and the baby bottle 104 is inserted. After the cover 110 has been placed and the baby bottle 104 has been inserted, an electrical power can be supplied via the electric heating 102 in the bottom area of the bowl 102. As only little water is in the bottom area of the bowl 102, the same quickly starts to boil and to pass over into water vapor. The hollow space formed by the cover 110, the bowl's inner walls and the outer walls of the baby bottle 104, is filled in this manner with water vapor under atmospheric pressure. As water has excellent heat transfer properties, the majority of the energy stored in the water vapor is conveyed to the baby bottle 104 and the baby food contained therein is heated. Water condensing at the walls and the cover 110 drops back to the bottom of the bowl 102 and can be evaporated again. If the heating power is switched off, for example by means of a time switch or a temperature control circuit, the water vapor is condensed very quickly and flows back into the bottom area of the bowl 102. An inadvertent overheating of the baby food can be largely avoided in this manner.

Although in FIG. 1 a commercially available baby's feeder is shown as food container 104, naturally, any other container 104 can also be used. For conventional instant food jars, for example, an additional adapter ring can be provided above the cover 110 for supporting the jar.

FIGS. 2 to 6 show various views of the cover 110. The annular projection 112 which engages between the container 104 and the inner wall of the bowl 102, serves for a positioning of the cover 110 as well as for a positive retention of the water vapor in the bowl 102. For a jamming or tilting of the cover in the bowl not occurring so easily, guide projections 114 are formed at the side of the annular projection 112 facing the bowl's inner wall, which projections lie against the bowl's inner wall when the cover is mounted. In the shown embodiment, altogether three web-like projections 114 offset with respect to one another by 120° are provided. The cover 110 further comprises an annular opening 116 for the food container 104. When a jar with instant baby food is used, an additional adapter for mounting the jar in the opening 116 can be provided.

In order to simplify the filling of the baby food warmer 100 for the user and to moreover ensure that not more than the low amount of water necessary for the evaporation is filled in, in the shown embodiment a measuring vessel 118 is formed at the cover 110, of which the capacity exactly corresponds to the required amount of water. Before the container 104 is placed into the bowl 102, this measuring vessel 118 is filled with water up to the brim and the whole contents is emptied into the bowl 102. Subsequently, the cover 110 is placed upon the bowl 102 and the food container 104 is inserted.

Figure 7:
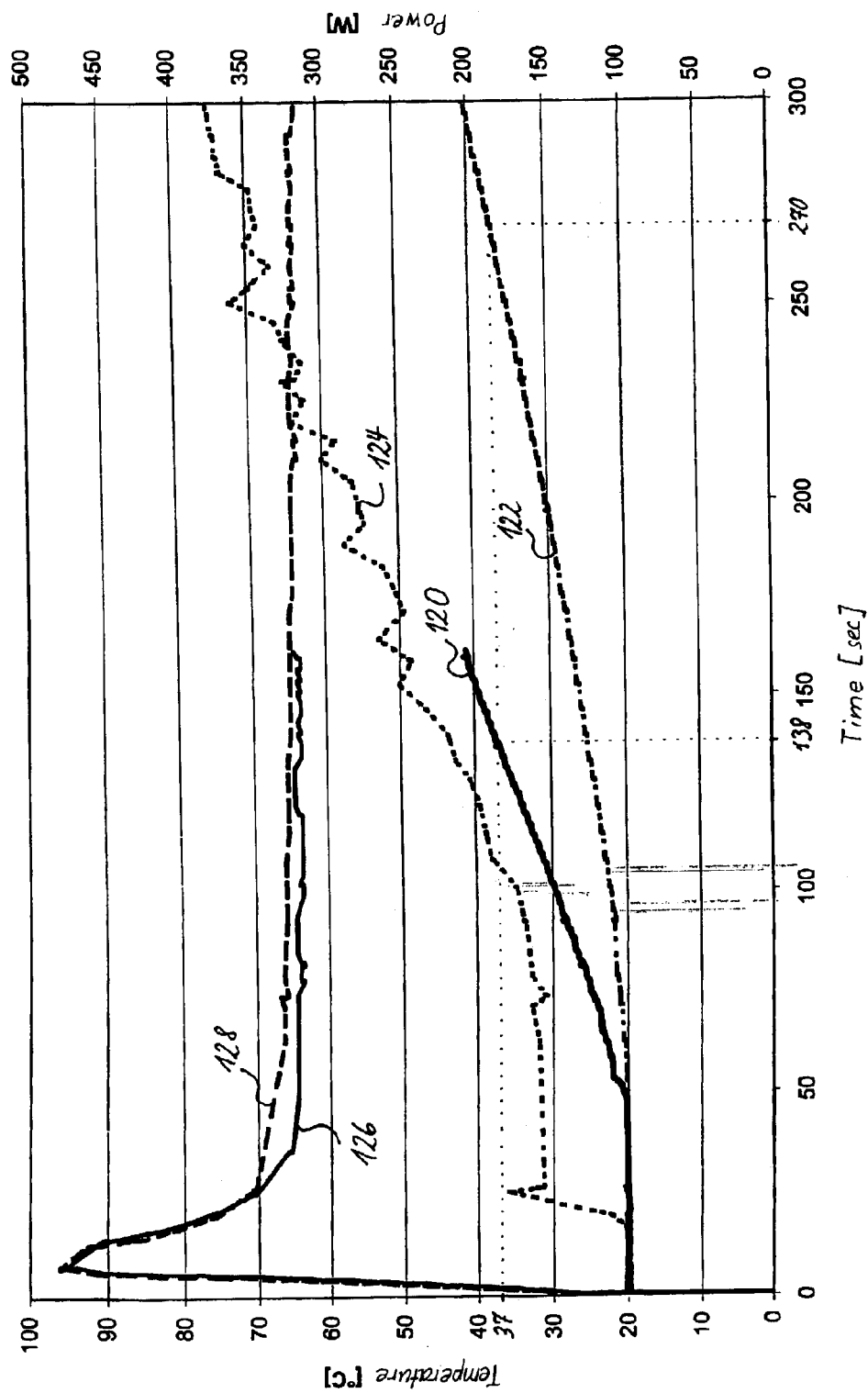
FIG. 7 shows a representation of the variation in time of the baby food temperature and the absorbed heat when the baby food is heated by means of water vapor compared to the conventional heating by means of a water bath.

FIG. 7 shows the variations in time of the power consumption and the temperature in the heating of baby food by means of water vapor according to the invention compared to the heating by means of a conventional water bath. Curve 120 shows the march of temperature in the baby bottle with a heating via water vapor according to the invention. With respect thereto, curve 122 shows the march of temperature of the bottle contents during the heating by means of a conventional water bath, i.e. when the baby food warmer is filled with an amount of water of approx. 150 ml. The clearly faster heating of the bottle contents can be seen immediately: After 138 seconds already, the bottle contents has reached 37° C. in the vapor operation according to curve 120, whereas, as can be taken from curve 122, the heating to 37° C. in the water bath is only reached after 270 seconds. As can be taken from curve 124 which shows the march of temperature of the water filled into the container in case of a water bath heating, the water bath already has a temperature of approx. 70° C. at the time when the bottle contents reaches 37° C. If one would leave the bottle in this water bath after the lapse of the 270 seconds necessary for the heating to 37° C., it would heat up to the temperature of 70° C. of the water bath. Thus, the admissible maximum temperature for the bottle contents would be exceeded by far. In contrast thereto, the low amount of water in the vapor heating according to the invention quickly cools below the boiling point, the heat transfer is interrupted and now only a very low temperature excess is effected. Therefore, the container with the baby food does not necessarily have to be removed immediately from the baby food warmer after the desired temperature has been reached. Curve 126 shows the power consumption in the vapor operation compared to a conventional water bath operation. The two curves only slightly differ, however, the power consumption in the vapor operation is below the value for the operation where the water is filled to the brim, as less energy is required due to the shorter heating time.

Although in each of the shown embodiments only one food container is shown, an essential advantage of the solution according to the invention is that several baby food containers can be heated contemporaneously if a larger bowl 102 and, for example, a cover 110 with a plurality of openings is provided. Exactly with a plurality of food containers to be heated, the advantage of the low temperature excess after the heating power has been switched off comes in useful, as there is only an insignificant difference between the temperature of the container removed first and the temperature of the container removed last.

The embodiments as described above may advantageously provide a baby food warmer which is not filled to the brim in the conventional sense, i.e. with an amount of water which reaches up to the brim of the bowl when the container is inserted, but it is only filled with a very low amount of water, for example, in case of a capacity of the bowl of approx. 300 ml, with less than 30 ml, so that the water starts to boil when an electrical heating capacity is supplied. The water vapor generated in this manner surrounds the baby food container and heats the food contained therein. Due to the fact that the bowl walls together with the container and/or an additional cover forms an essentially sealed chamber for retaining water vapor, it is prevented that the complete amount of water vapor escapes to the outside. Due to the high temperature and the enthalpy of vaporization of the water vapor, the food is heated very quickly. Due to the condensation at the boundaries of the closed chamber, i.e. the bowl walls, the container and an optional cover, the water can be heated and evaporated again. An essential advantage of this solution according to the invention is that after the interruption of the heating capacity supply, the low amount of water rapidly cools below the boiling point and there is no more heat transfer to the food container. Accordingly, an overheating of the baby food to be heated can be avoided.

The heating of the baby food according to the invention via water vapor surrounding the container permits a particularly fast heating of the food and, due to the shorter heating time, a reduction of the required electric energy. Moreover, the growth of harmful bacterial impurities is prevented as the heat transfer medium passes over to the very hot vapor phase with every heating process.

As the power and/or the thermal behavior of the electric heating is designed for the evaporation of a low amount of water in the area of the bowl bottom, the required amount of water can moreover be reduced with respect to conventional baby food warmers. Such an electric heating can, for example, comprise a resistance with positive temperature coefficient, a so-called PTC-heating element. Such a PTC-heating element offers, for example with respect to a resistance wire heating, the advantages of a high initial performance, if the heating element is at room temperature, as well as a self-regulating performance behavior with an increasing temperature.

According to an advantageous embodiment, the cover cannot be inserted into the bowl in a hermetically sealing manner. Thereby, during the heating process, a certain part of the evaporated water escapes and can be replaced by fresh water for the next heating process. In this manner, bacterial impurities can be largely avoided.

Due to the fact that the cover has an essentially annular design and can be positively engaged with the container inserted in the bowl, in a particularly simple manner, an essentially sealed chamber for retaining water vapor is formed by the bowl walls, the bowl bottom, the container's outer walls and the inner surface of the cover.

If a power control device is provided at the baby food warmer, which can control the power delivery of the electric heating, the speed of the heating process can be optimized in a simple manner.

As with the heating of the baby food container via water vapor according to the invention, only a small further heating is effected after the power supply has been switched off, the heating process can also be controlled by a time control device for adjusting a heating time of the electric heating. Such a timer represents an embodiment which is particularly easy to operate and inexpensive.

If one provides at least one guide element at the cover for positioning the cover at the bowl, the guide element engaging between the bowl's inner wall and the outer wall of the container, this cover can be protected from laterally shifting on the baby food warmer in a particularly simple manner.

According to an advantageous embodiment, this guide element is an essentially annular projection, integrally formed at the cover. In this manner, it can be prevented that an inadmissibly high amount of water vapor escapes to the outside.

In order to avoid a jamming of the cover in the bowl in case of a thermal expansion or tilting, the guide element can comprise at least one projection which lies against the inner wall of the bowl when the cover is placed.

In order to be able to fill in the amount of water required for the evaporation without any further devices and in a sufficiently precise manner, a measuring vessel for measuring the required amount of water can be formed at the cover.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. Electric baby food warmer for heating substances held in a container, preferably baby food, by means of a heat transfer medium, the baby food warmer comprising a bowl, into which the container can be inserted for heating, and an electric heater for heating the bowl bottom,
   wherein the bowl walls form together with the container and/or a cover an essentially sealed chamber for retaining water vapor, and
   wherein the cover has a form that it can positively fit with the container inserted in the bowl.

2. Electric baby food warmer according to claim 1, wherein the power and/or the thermal behavior of the electric heater is designed for evaporating a low amount of water in the area of the bowl bottom.

3. Electric baby food warmer according to claim 1, wherein the cover can be inserted into the bowl in a non-hermetically sealing manner.

4. Electric baby food wanner according to claim 1, wherein a closed side of the container is facing the bowl bottom.

5. Electric baby food warmer according to claim 1, wherein the cover has an essentially annular design.

6. Electric baby food wanner according to claim 1, further comprising a power control device for controlling the power delivery of the electric heater.

7. Electric baby food warmer according to claim 1, further comprising a time control device for adjusting a heating time of the electric heater.

8. Cover for an electric baby food warmer for heating substances held in a container, preferably baby food, by means of a heat transfer medium, the baby food warmer comprising a bowl, into which the container can be inserted for heating, and an electric heater for heating the bowl bottom, wherein the cover forms together with the bowl walls and/or the container an essentially sealed chamber for retaining water vapor, and wherein the cover has a form that it can positively fit with the container inserted in the bowl.

9. Cover according to claim 8, the cover comprising least one guide element for positioning the cover at the bowl, the guide element engaging between the bowl's inner wall and the outer wall of the container.

10. Cover according to claim 9, wherein the guide element is an essentially annular projection integrally formed at the cover.

11. Cover according to claim 9, wherein the guide element comprises at least one projection which is in contact with an inner wall of the bowl when the cover is mounted.

12. Cover according to claim 8, wherein a measuring vessel for measuring the amount of water required for the heating is formed at the cover.

13. Electric baby food warmer for heating substances held in a container, preferably baby food, with a bowl, into which the container can be inserted for heating, and with an electric heater for heating the bowl bottom, the bowl being filled with water in an operative condition, wherein the height of the water level of the water filled in is lower than the height of the bowl, and wherein the bowl walls form together with the container and/or a cover an essentially sealed chamber for retaining water vapor, and wherein the cover has a form that it can positively fit with the container inserted in the bowl.

14. Electric baby food warmer according to claim 13, wherein the volume of the water filled in is less than 30 ml.

* * * * *

UNITED STATES PATENT AND TRADEMARK OFFICE
CERTIFICATE OF CORRECTION

PATENT NO. : 6,861,618 B2
DATED : March 1, 2005
INVENTOR(S) : Heidi Binet et al.

It is certified that error appears in the above-identified patent and that said Letters Patent is hereby corrected as shown below:

Column 6,
Lines 57 and 62, "wanner" should be -- warmer --

Column 7,
Line 1, "wanner" should be -- warmer --

Signed and Sealed this

Seventeenth Day of May, 2005

JON W. DUDAS
*Director of the United States Patent and Trademark Office*